US012565377B2

(12) United States Patent
Gaymer Jones et al.

(10) Patent No.: US 12,565,377 B2
(45) Date of Patent: Mar. 3, 2026

(54) ASSEMBLY OF LOAD CONTAINERS

(71) Applicant: LOHMM PARTICIPACOES S.A, Aguas Claras (BR)

(72) Inventors: Michael Gaymer Jones, Salvador (BR); José Christino De Magalhães Junior, Sao Paulo (BR)

(73) Assignee: LOHMM PARTICIPACOES S.A., Aguas Claras (BR)

(*) Notice: Subject to any disclaimer, the term of this patent is extended or adjusted under 35 U.S.C. 154(b) by 232 days.

(21) Appl. No.: 18/280,685

(22) PCT Filed: Mar. 15, 2022

(86) PCT No.: PCT/BR2022/050088
§ 371 (c)(1),
(2) Date: Sep. 7, 2023

(87) PCT Pub. No.: WO2022/192975
PCT Pub. Date: Sep. 22, 2022

(65) Prior Publication Data

US 2024/0158159 A1 May 16, 2024

(30) Foreign Application Priority Data

Mar. 16, 2021 (BR) ........................ 102021004997-9

(51) Int. Cl.
*B65D 90/00* (2006.01)
*B65D 90/18* (2006.01)
(Continued)

(52) U.S. Cl.
CPC ......... *B65D 90/0006* (2013.01); *B65D 90/18* (2013.01); *B65D 90/48* (2013.01);
(Continued)

(58) Field of Classification Search
CPC .......... B65D 2501/24987; B65D 19/42; B65D 90/0006; B65D 90/18; B65D 90/48;
(Continued)

(56) References Cited

U.S. PATENT DOCUMENTS

| | | | | | |
|---|---|---|---|---|---|
| 1,324,653 | A * | 12/1919 | Ferdon | A47J 39/00 | 220/23.88 |
| 3,966,075 | A * | 6/1976 | Schultz | B65D 88/025 | 220/8 |
| 4,845,804 | A * | 7/1989 | Garrett | B60B 33/06 | 16/33 |
| 5,774,059 | A | 6/1998 | Henry et al. | | |
| 5,894,277 | A | 4/1999 | Keskin et al. | | |
| 6,010,021 | A * | 1/2000 | Zuidam | B65D 77/0453 | 206/499 |

(Continued)

FOREIGN PATENT DOCUMENTS

| | | | |
|---|---|---|---|
| AU | 2017202128 | A1 | 10/2017 |
| WO | 2015087149 | A2 | 6/2015 |

OTHER PUBLICATIONS

International Search Report and Written Opinion for Application No. PCT/BR2022/050088, mailed on Jun. 7, 2022, 27 pages.

*Primary Examiner* — Kareen K Thomas
(74) *Attorney, Agent, or Firm* — Thomas Joseph

(57) ABSTRACT

An assembly of load containers can facilitate the transportation, storage and handling of miscellaneous goods. The containers have movement means, can be stacked on top of one the other, and the assembly of containers is specially adapted to fit in a 20-ft or 40-ft shipping container. Such containers have locking means with remote tracking and can be transported inside dry-box maritime containers, or directly on or inside any transport means.

11 Claims, 11 Drawing Sheets

(51) Int. Cl.
*B65D 90/48* (2006.01)
*E05B 39/00* (2006.01)
*E05B 45/06* (2006.01)

(52) U.S. Cl.
CPC ............ *E05B 39/005* (2013.01); *E05B 45/06* (2013.01); *B65D 2590/0083* (2013.01); *B65D 2590/666* (2013.01)

(58) Field of Classification Search
CPC ...... B65D 2590/0083; B65D 2590/666; B65D 2590/0066; B65D 88/022; B65D 81/32; B65D 81/3288; E05B 39/005; E05B 45/06; E05B 39/04; G06Q 10/08; H04Q 9/00
See application file for complete search history.

(56) References Cited

U.S. PATENT DOCUMENTS

| | | | | |
|---|---|---|---|---|
| 6,753,775 | B2 | 6/2004 | Auerbach et al. | |
| 7,556,472 | B2 * | 7/2009 | Arneson | B65G 39/025 414/523 |
| 8,773,262 | B2 | 7/2014 | Bae et al. | |
| 10,648,722 | B2 | 5/2020 | Smith | |
| 11,912,465 | B2 * | 2/2024 | Subramani | A47G 23/06 |
| 2004/0060843 | A1 * | 4/2004 | Sabol | B65D 81/107 206/499 |
| 2015/0136633 | A1 * | 5/2015 | Sarnoff | A47J 36/2405 206/499 |
| 2016/0375726 | A1 * | 12/2016 | Trickle | B62B 1/12 280/43.11 |

* cited by examiner

ASSEMBLY OF LOAD CONTAINERS

CROSS REFERENCE TO RELATED APPLICATIONS

The present application is a U.S. national stage application of PCT International Application No. PCT/BR2022/050088, filed Mar. 15, 2022, and published as PCT Publication WO/2022/192975 on Sep. 22, 2022, which claims priority to Brazilian Application No. BR 102021004997-9, filed on Mar. 16, 2021. The disclosures of the foregoing applications are hereby incorporated by reference in their entirety into the present application.

TECHNICAL FIELD

The present disclosure relates to a set of cargo containers that facilitate the transportation, storage, and handling of a variety of goods. The set of cargo containers is composed of at least one container that holds a plurality of cargo chests inside. The chests can be stacked on top of each other. The set of containers is specially adapted to fit on a 20 ft or 40 ft shipping container and can be transported directly by various means, such as inside box trucks or even directly on the truck body, in addition to the most varied modes of transportation: rail, air, etc. The set of cargo containers also features a remotely tracked locking means.

A shipping container, or dry box, is understood as an international standard container for intermodal transportation, usually having a double door at one end and is normally used to transport dry cargo (food, clothing, electronic equipment, furniture, etc.). This type of container often has two standardized versions: 20 ft 20'×8'×8'6") and 40 ft 40'×8'×8'6")—external measurements. Dry box shipping containers are stackable in port yards or on vessels and can be loaded directly onto truck bodies or railcars.

The present disclosure is directed to the transportation and storage of a variety of goods, especially inside shipping containers. However, it is suitable to be transported by any means: land (road, rail, etc.), air, river, sea, etc. regardless of whether it is loaded into a dry box shipping container.

TECHNICAL BACKGROUND

One of the major drawbacks in the transportation of goods is that sometimes different products are not allowed to be loaded. For example, some companies do not permit personal hygiene products and foodstuffs to be transported in the same truck, or even in a dry box container. In more extreme cases, some legislations prohibit, for example, the freight of pharmaceuticals along with various goods such as cleaning products, insecticides, etc. The risk of contamination makes simultaneous transportation unfeasible. In this case, trucks or containers may be idle for a long time waiting for loading in order to make the freight cost feasible.

Another drawback of the art lies in the fact that the storage or even handling or moving goods, e.g., in shipping containers or box trucks, is normally done using pallets. The packages or boxes are bundled together using plastic film or tie rods and placed on the pallets. As goods and pallets do not have their own handling means, these goods are generally handled using forklifts or trolleys. Such cargoes are subjected to a high risk of damage during transportation or handling when not properly fastened. This disadvantage results in increased transportation costs and higher insurance rates.

In the retail market, another drawback arises from the problems mentioned in the previous paragraph: in general, products sold by retailers are transported in cardboard boxes and, upon reaching their destination, these boxes are temporarily taken to the warehouse and then to the display shelves; the products are removed from these cardboard boxes, which then form stacks of boxes that must be disposed of by the retailer, such as supermarkets, drugstores etc.

The transportation of higher value-added products, or even fragile goods, together with other products can be problematic. Firstly, the integrity of the products can be affected if there are not properly packaged; and secondly, these products are at greater risk of theft. For instance, high value products, such as whiskeys and some distillates are at risk of loss due to multiple damage and are also targeted by criminals due to the ease of resale. The same occurs with some cosmetics, medicines, electronics, etc. In these cases, both the cost of insurance and freight can become significant or even unfeasible.

In addition, smaller or fractional cargoes have the inconvenience of not making the most of the container's volume. Furthermore, when poorly packaged, there is a risk of goods getting mixed up with the others.

Boxes or chest-type storage containers (or simply chests) with handling means, e.g., castors, are known and can be used for storing goods. However, such boxes are not suitable for stacking inside these containers and do not exploit the inner space thereof, thus rendering the stacking unstable. In addition, such boxes lack any means of engaging or attaching them together, which results in a relative displacement thereof, increasing, therefore, the risk of cargo damage.

In addition, containers or inner boxes are usually sealed by means of mechanical seals. Their opening, for inspections or removal of goods, occurs by breaking these seals, which puts the integrity of the transported material at risk, especially when different goods are mixed in the container.

Finally, the transportation in containers by known means is usually not appropriate to serve the retail market, where goods or industrial equipment of smaller volume are demanded. The cost of transporting such small volumes may be unfeasible.

SOLUTION PROPOSED BY THE INVENTION

In a way to mitigate or eliminate the drawbacks outlined above, the present invention provides for a set of cargo containers for transportation in dry box shipping containers or directly on (or inside) the most diverse means of sea, river, air, rail, and road transport, such as dry cargo, bulk carriers, box, sider, or car hauler trucks. Such a set of containers is also intended for varied cargo volumes, where the containers are stackable, with handling means for manual management or by forklift and having a remotely tracked locking means dispensing with the use of physical seals.

OBJECTS OF THE INVENTION

One of the objects of the invention is to promote a set of cargo containers specially adapted for transportation in cargo shipping containers, making the most of the inner space of a 20 ft and 40 ft shipping container.

It is also an object of the invention to propose a set of cargo containers for land, water or air transport with cargo fractionation and product separation to prevent any mixing or contact between the products.

The set of cargo containers aims to serve the retail market in a viable way.

In addition, it is an object of the invention to provide a set of cargo containers that allows a safe transportation of different types of goods simultaneously, with no mixing or contamination therebetween.

It is an object of the present invention to provide a set of containers, wherein the containers can be handled by the operator by dispensing with the use of trolleys and pallets and which can still be handled by means of forklifts. Such a set of containers allows the products to be transported to the retail store.

Another object of the invention is to eliminate or mitigate the need to use cardboard boxes or packages in the retail market.

The object of the present invention is to enable the transportation of fragile and/or high value-added products with a safe and low-cost solution.

It is also an object of the present invention to provide a set of cargo containers with stable stacking means.

Additionally, it is an object of the invention to provide a set of containers with remotely tracked locking means dispensing with the use of physical seals, wherein the opening of the containers can be programmed and authorized remotely.

In order to allow a better understanding of the proposed solution, a detailed description of an example of embodiment of the invention is given below.

DETAILED DESCRIPTION OF THE INVENTION

Figure 1:
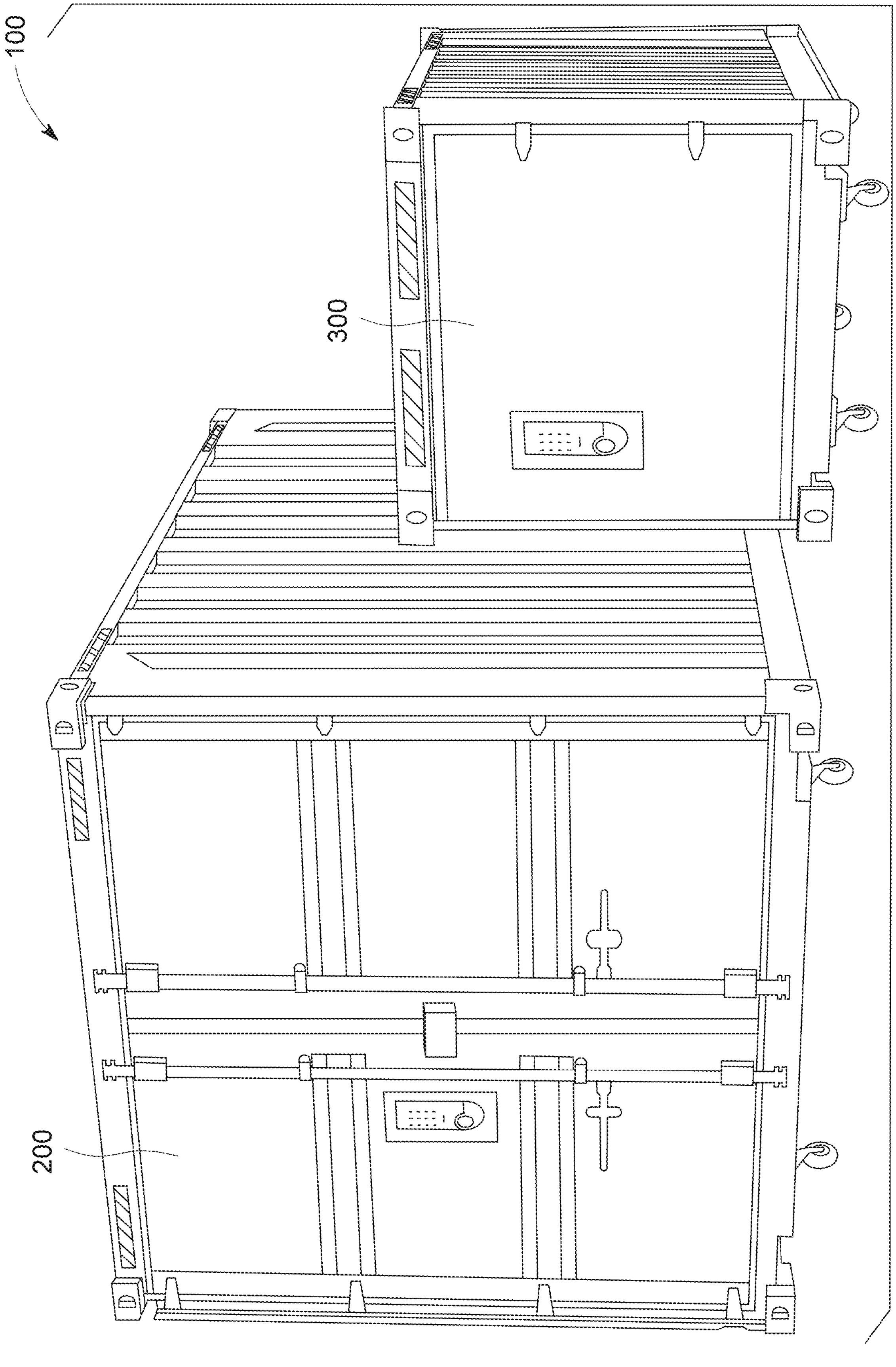
FIG. 1 is a perspective view of a set of cargo containers 100.
Figure 2:
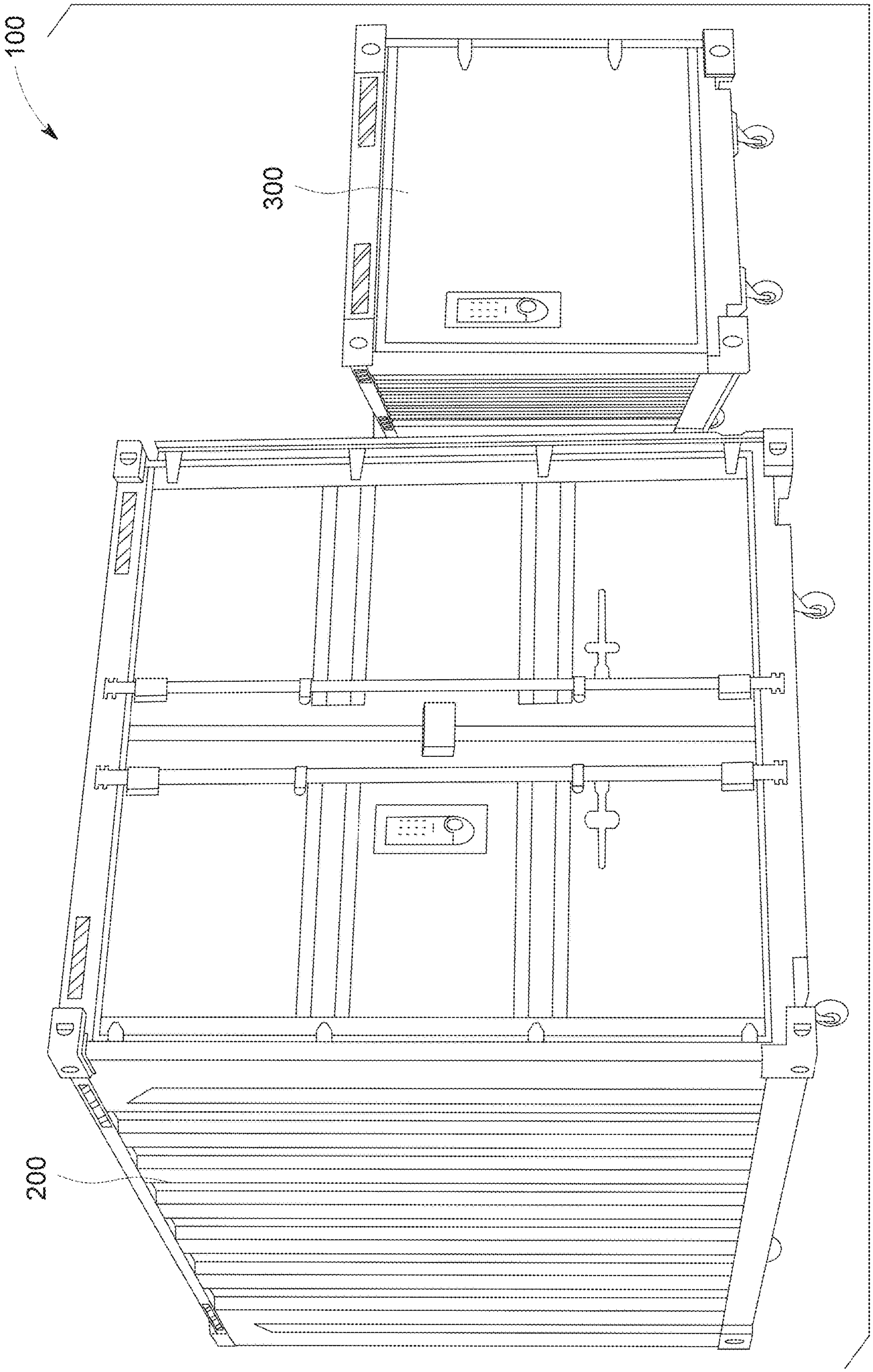
FIG. 2 is another perspective view of a set of cargo containers 100.
Figure 3:
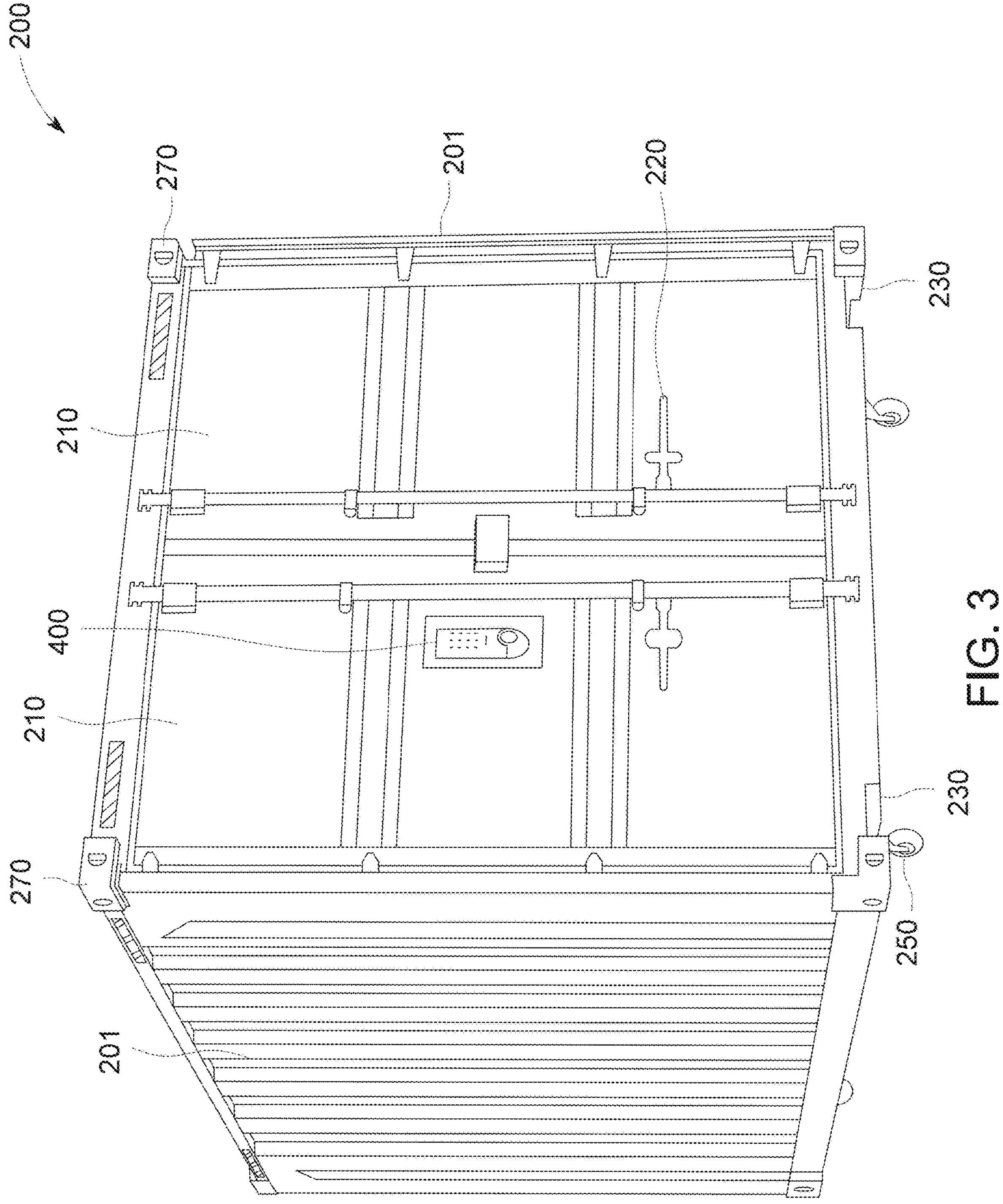
FIG. 3 is a front perspective view of the container 200.
Figure 4:
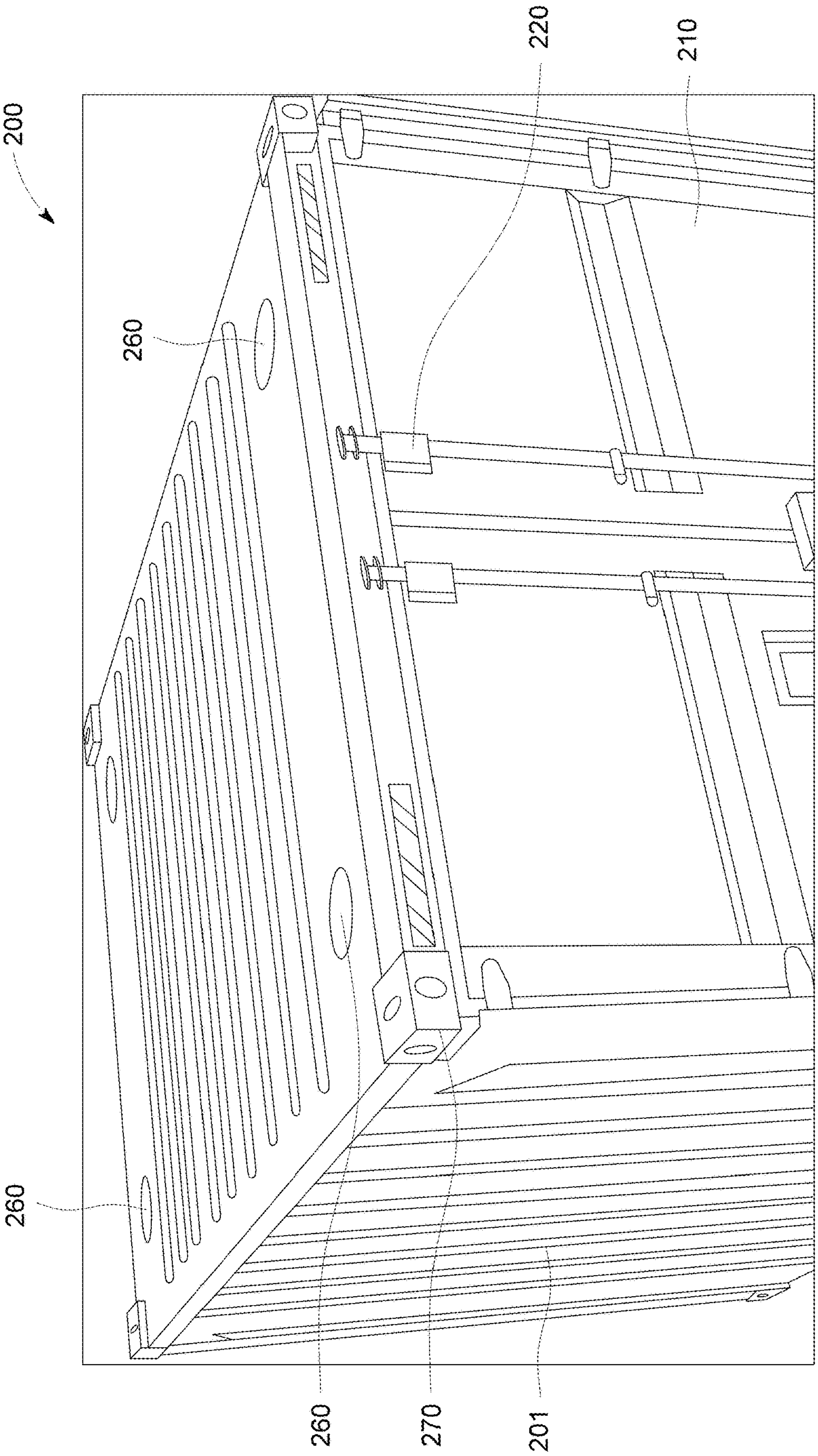
FIG. 4 is a top perspective view of the container 200.

Referring to FIGS. 1 and 2, the set of cargo containers 100 comprises at least one container 200 and at least one chest 300. The containers 200 have a greater volume and load capacity than the chests 300. Both the container 200 and the chests 300 can hold a wide range of goods to be transported as needed. In a preferred arrangement, the container 200 can hold up to 8 (eight) chests 300 inside.

Figure 8:
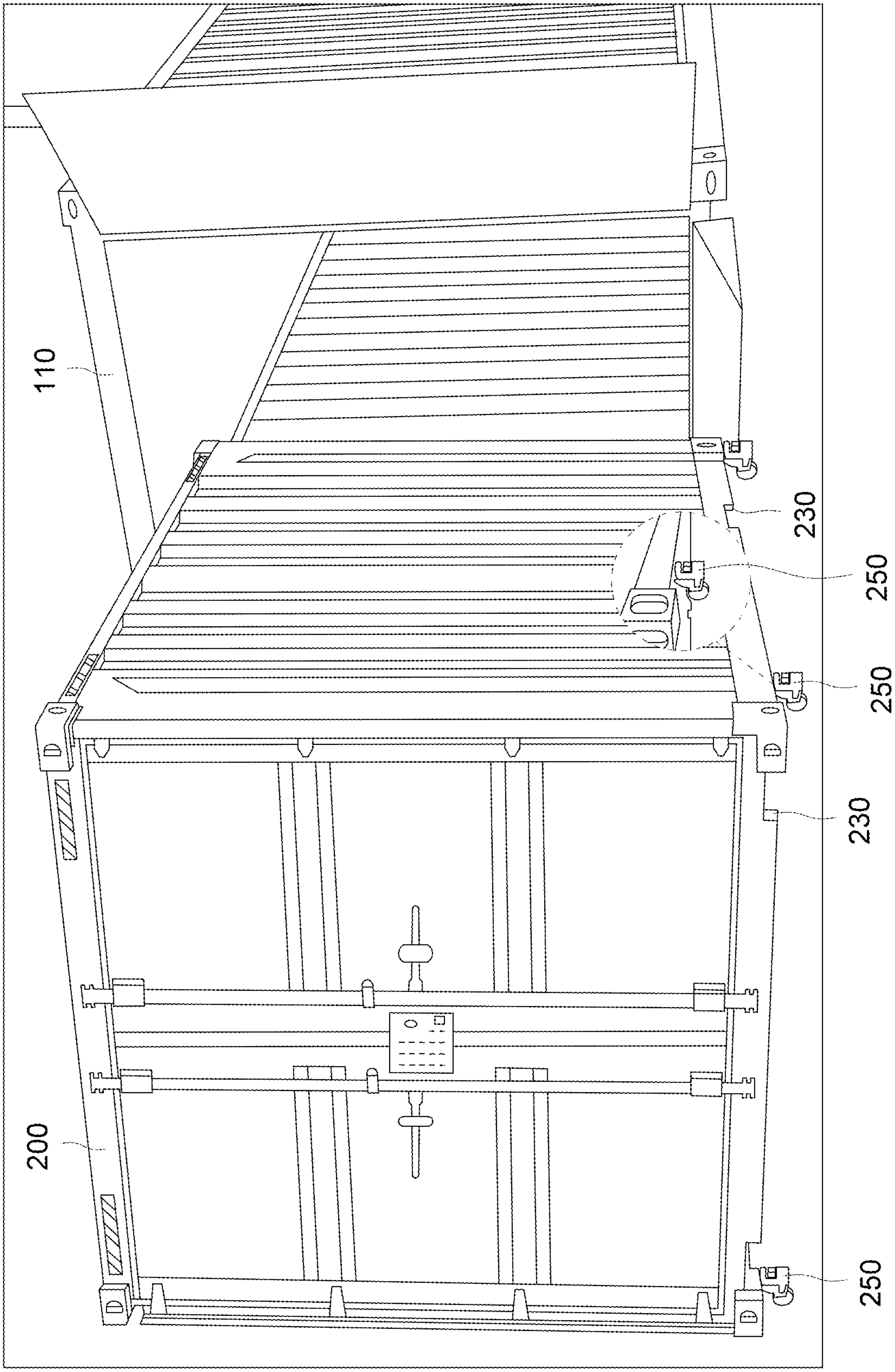
FIG. 8 is a perspective view of the container 200 being inserted in a shipping container.

The width and height of a container 200 are compatible, respectively, with the working width and height of a shipping container 110—see FIG. 8.

The total length of two containers 200 lined up is compatible with the working length of a 20 ft shipping container. A 40 ft shipping container has a working length compatible with that of four containers 200 lined up.

The dimensions of the container 200 are preferably 290 cm×210 cm×210 cm (length×width×height). The dimensions of each chest 300 are preferably 140 cm×100 cm×95 cm (length×width×height).

According to FIGS. 3 to 8, the container 200 comprises a metallic structure 201, preferably made of steel and in a parallelepiped format. The container 200 also has a door formed by double sheets 210 with a manual lock 220. The base of the container 200 is fitted with recesses for forklift forks 230 and retractable castors 250 for movement. The upper wall of the container 200—see FIG. 4—preferably has four recesses 260 to hold the castors 250 of another container 200 stacked immediately above—see FIG. 7. At the vertices, the container 200 includes lifting points 270 for eventual cable anchorage or mooring. A floor (not shown), preferably in steel, is provided inside to hold the cargo. Each container 200 can be fitted with a remote tracking lock 400.

Figure 6:
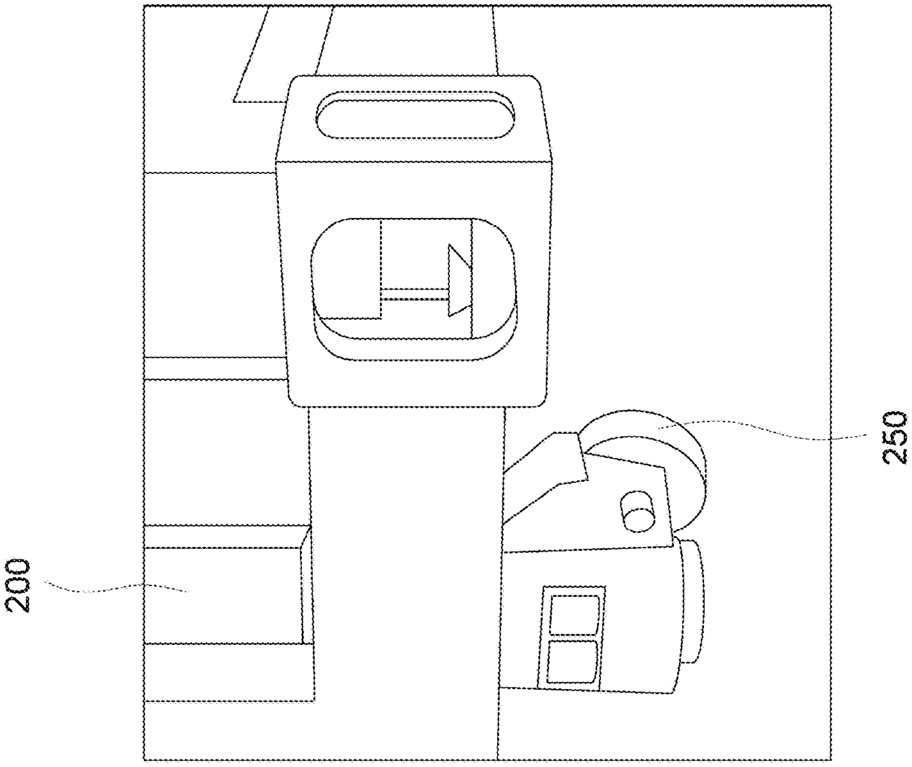
FIG. 6 is a detailed view of the container 200 castor.
Figure 5:
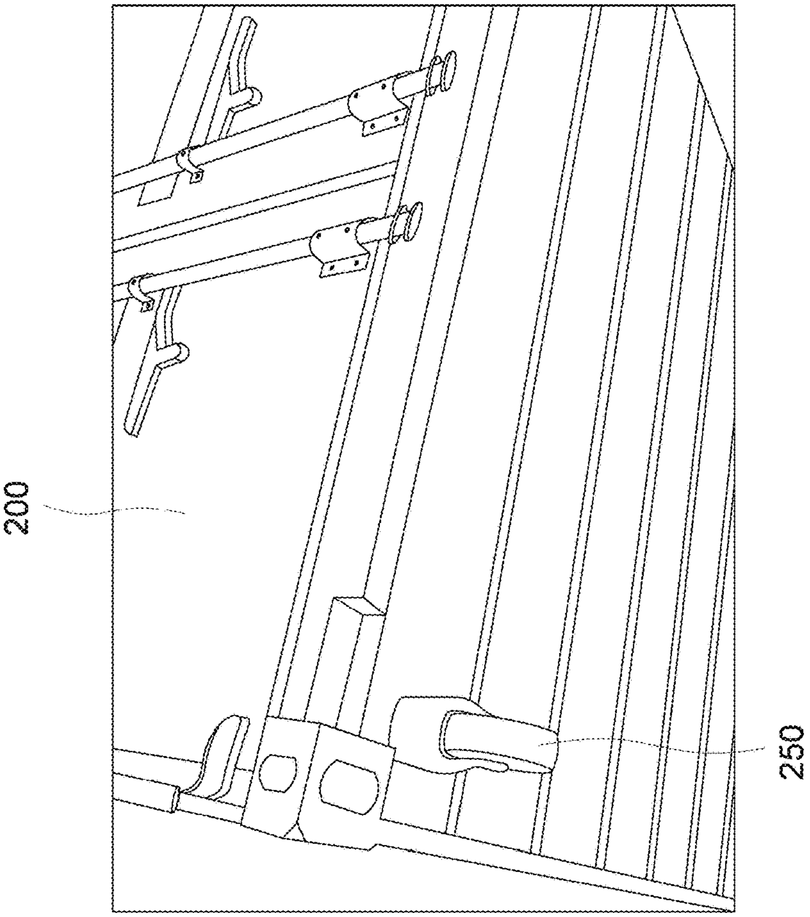
FIG. 5 is a bottom perspective view of the container 200.

As shown in FIG. 5, the containers 200 have retractable castors 250 that allow the container to be moved in all directions. Said castors are retractable, lockable and can be embedded inside the container 200 when the cargo is not being moved. Each container 200 preferably comprises four retractable castors 250. FIG. 6 shows a constructive variant of the retractable castor 250 used in the container 200.

Figure 7:
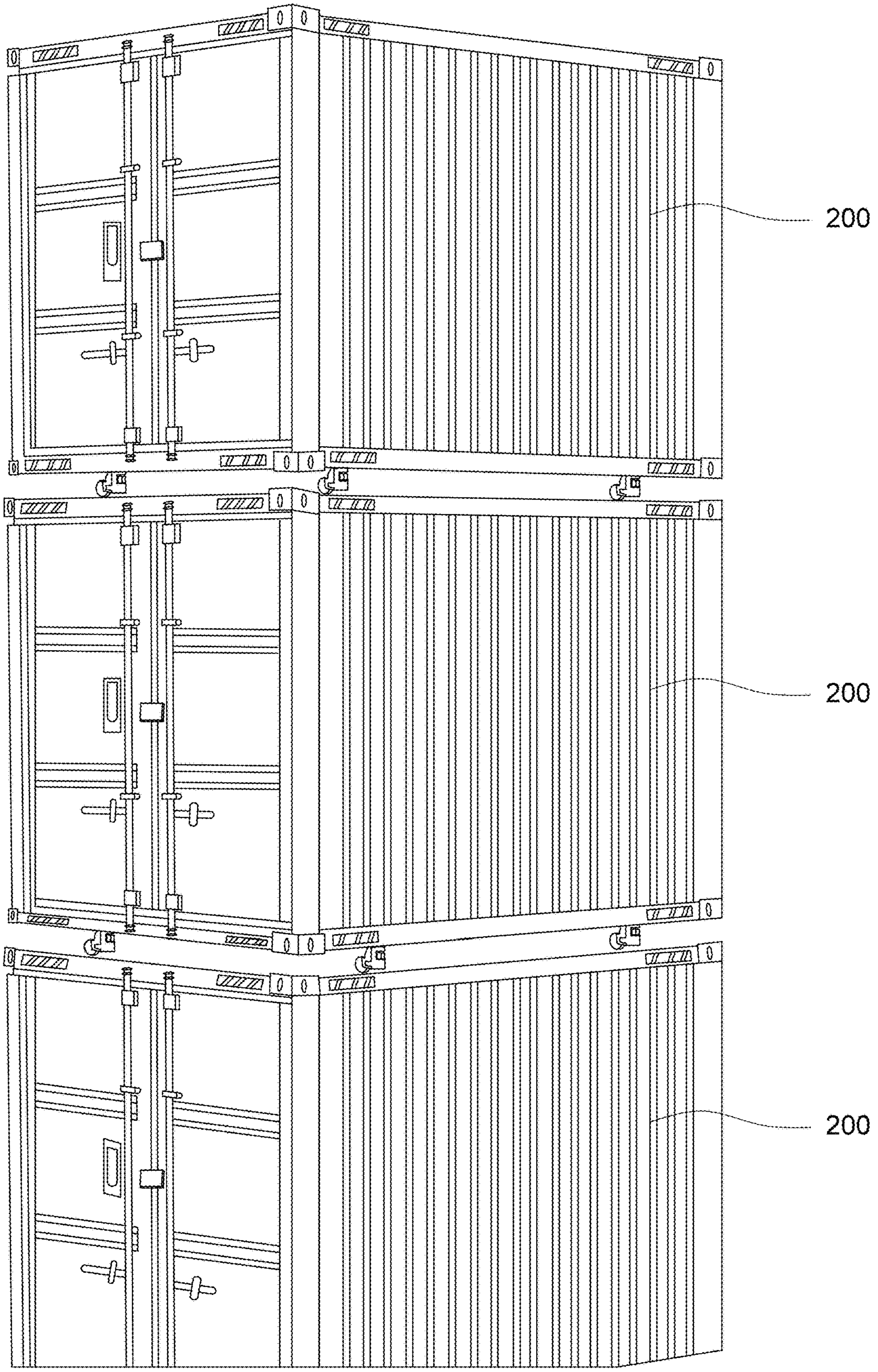
FIG. 7 is a perspective view of an example of container 200 stacking.

FIG. 7 shows an example of container 200 stacking, wherein the retractable castors 250 are held in the recesses 260 provided in the upper wall of a container 200 immediately below.

The castors 250 allow the containers 200 to be moved manually, as exemplified in FIG. 8, wherein a container 200 is inserted into a shipping container 110.

Figure 9:
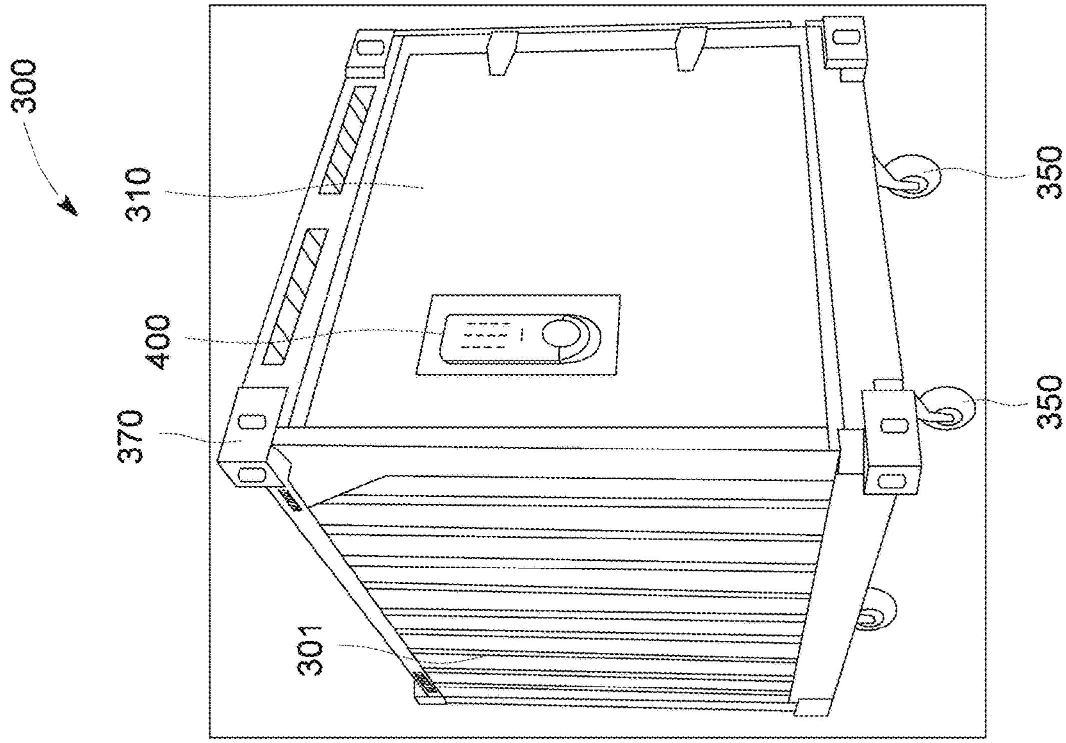
FIG. 9 is a perspective view of the chest 300.
Figure 10:
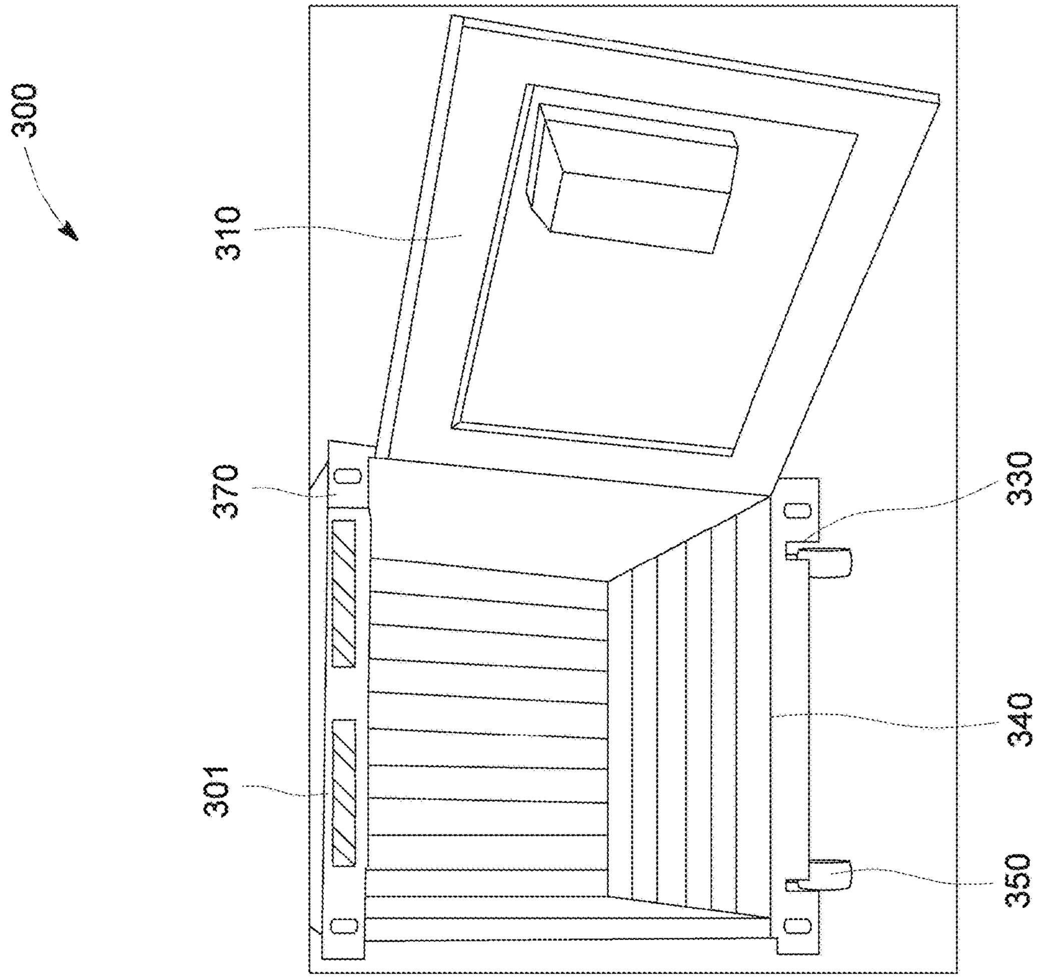
FIG. 10 is a front view of the chest 300 with open door.

As illustrated in FIGS. 9 and 10, each chest 300 comprises a metallic structure 301, preferably made of steel and having a parallelepiped format. The chest 300 is fitted with a single sheet door 310 with a locking device 400. The base of the chest 300 is fitted with recesses for forklift forks 330 and with castors 350 for movement. The chests 300 also have lifting or anchoring points 370 for engaging the boxes when eventually stacked. A floor (not shown), preferably made of steel, is provided inside the chest 300 to hold the cargo.

Figure 11:
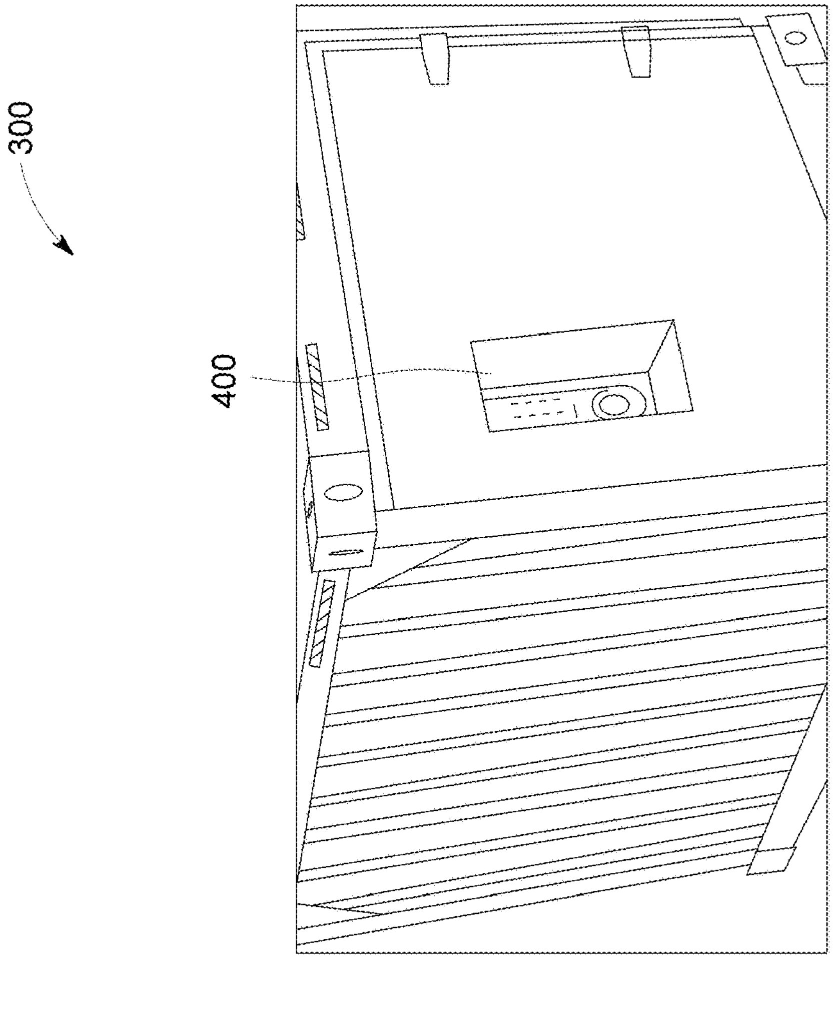
FIG. 11 is a perspective view of the chest 300 with built-in lock according to another embodiment of the invention.

The locking device 400 of the chest can be the same type as the remote tracking lock 400 of the container 200. Alternatively, the remote tracking lock 400 of the chest 300 may be embedded in the door 310 as illustrated in FIG. 11.

Figure 12:
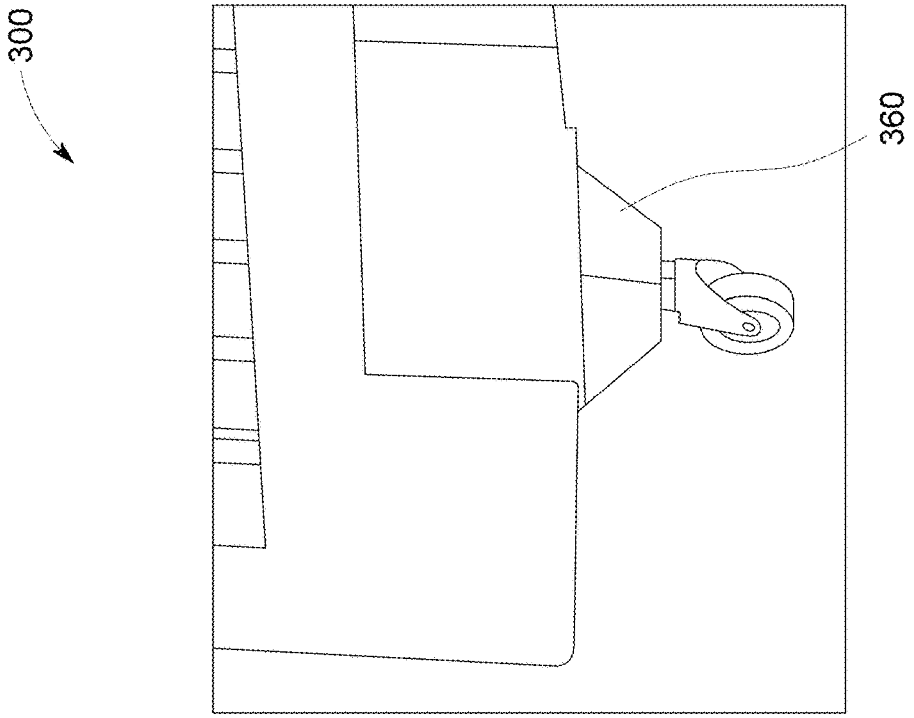
FIG. 12 is a detail of the castor of the chest 300 according to an embodiment of the invention.

The castors 350 of the chest 300, see FIGS. 9 and 12, allow the box to be moved manually, with no operator effort, in all the directions in the plane. Castors 350 can be attached to trapezoidal supports 360 provided on the base of the chest 300. Such castors may also comprise known blocking means to limit displacement. Such castors may be protected by a cover (not shown) when stacking the chest 300 is required. Each chest 300 preferably comprises four trapezoidal supports 360 and consequently four castors 350. In the same way as the container 200 stacking, each chest 300 can be fitted with preferably four recesses (not shown) in its upper wall to hold the castors 350 of another chest 300 stacked immediately above.

Figure 13:
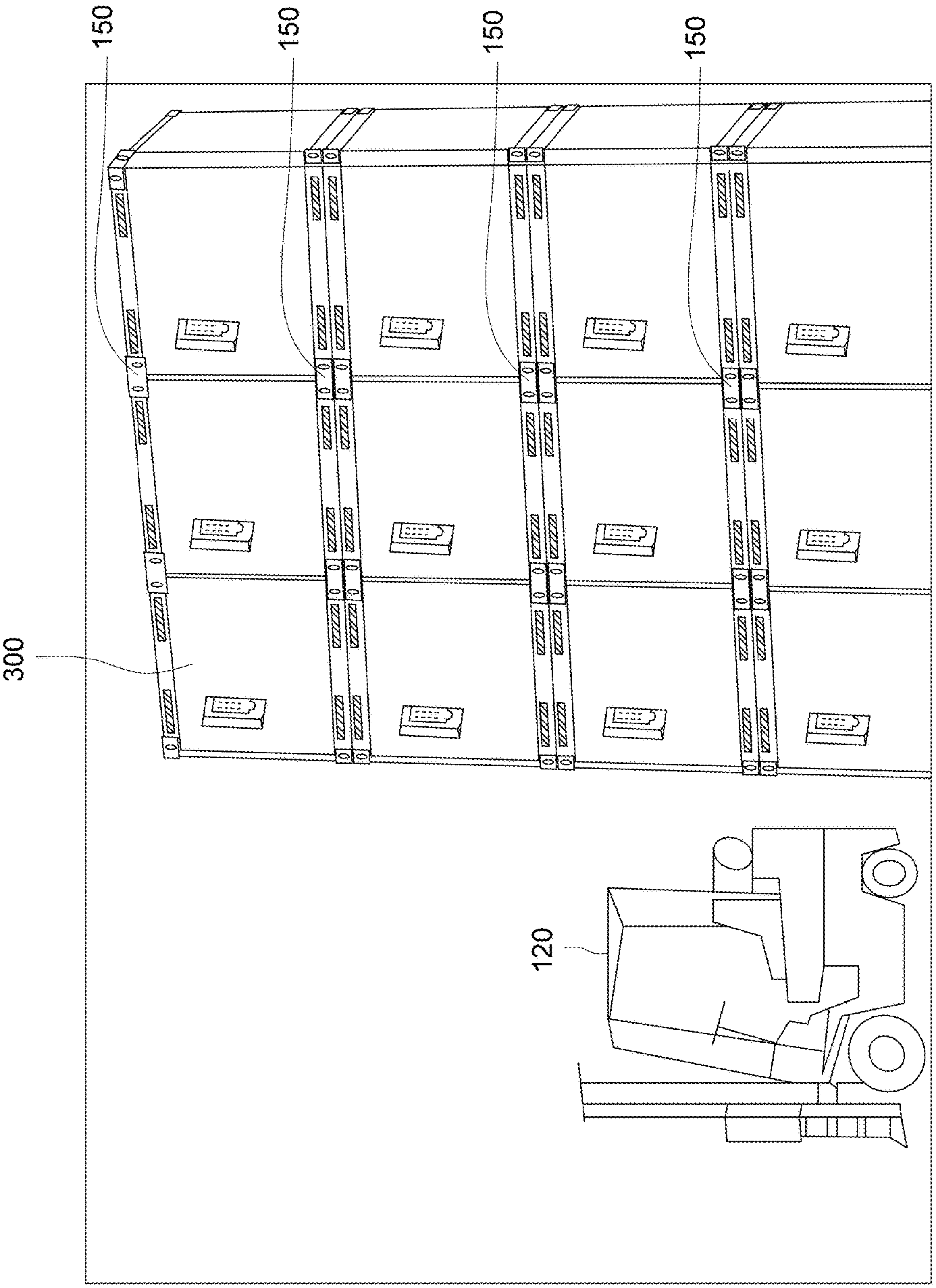
FIG. 13 is a perspective view of an example of chest 300 stacking.

The means that allow the stable stacking of the chests 300 can be seen in FIG. 13. The attachment of the chests 300 is given by clamps 150 inserted in the anchoring points 370, allowing stable stacking of the chests 300 so that the set can be moved by lifting or through the action of a forklift 120.

Figure 14:
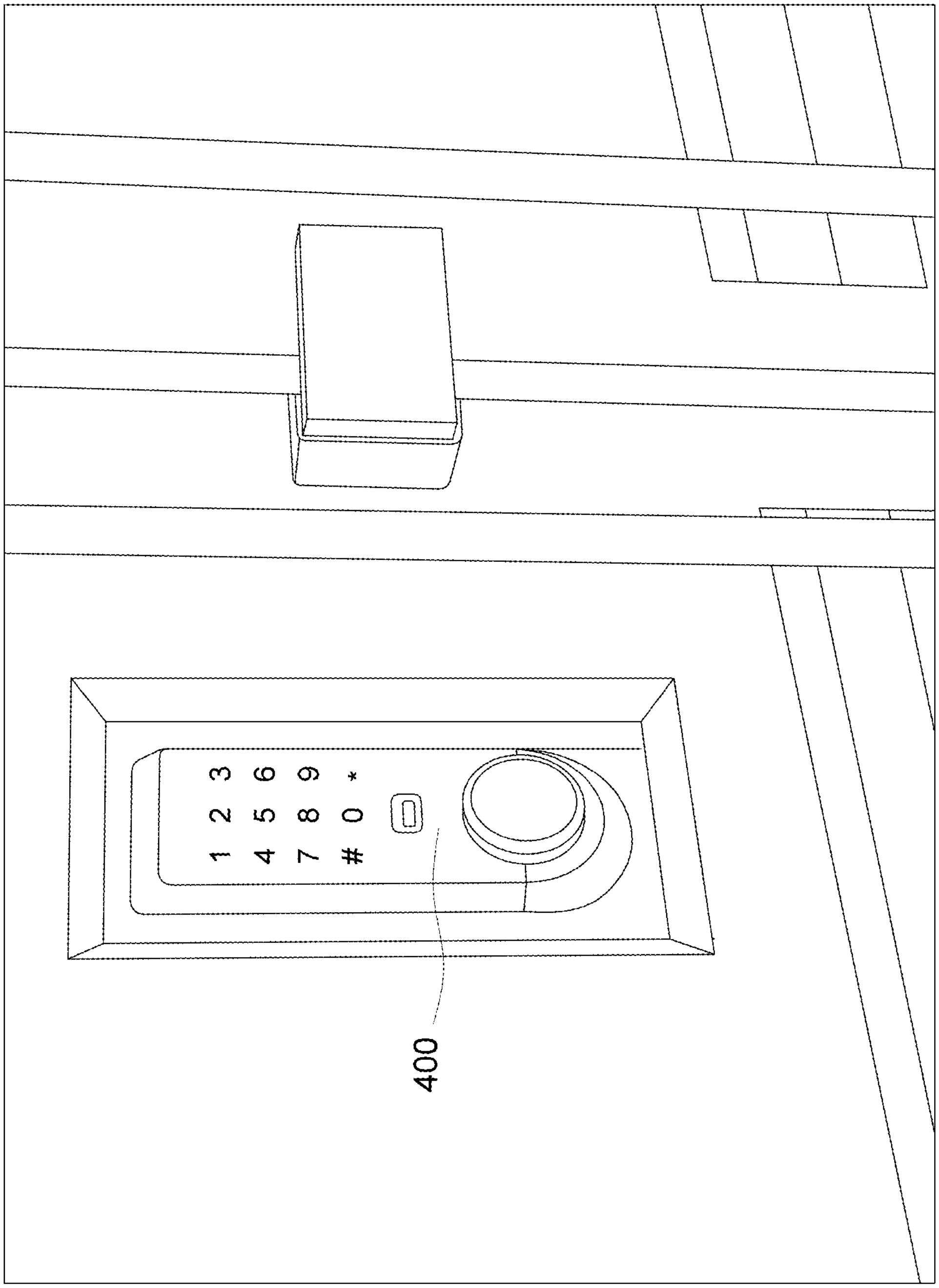
FIG. 14 is a detail of a remote tracking lock 400 according to the invention.

FIG. 14 shows in detail the remote tracking lock 400 comprising an electronic lock or latch incorporating a GMS (Global System for Mobile) chip allowing remote tracking and/or activation. The remote activation lock can be tracked redundantly by means of a GPS (Global Positioning System) system or by satellite localization. In addition, the remote tracking lock 400 further comprises: means of power supply by batteries and solar panels; control center that allows programming the opening of the lock and recording the door openings, and; means of face-to-face activation of the lock through QR Code reader and/or numerical keyboard. The remote tracking lock 400 allows the scheduled opening of the doors according to transportation logistics and can also be supplied with an alarm to warn any abnormal condition.

Those skilled in the art may notice that several transport configurations are possible since the containers 200 and chests 300 set aside a plurality of combinations according to the volume, quantity, and type of cargo to be transported. Furthermore, different types of goods can be transported at the same time, without contact or interaction therebetween.

It is also possible to observe that the set of cargo containers 100 can be transported inside dry box shipping containers; or directly on (or inside) the most diverse means of sea, river, air, rail, and road transport, such as dry cargo, bulk carriers, box, sider, or car hauler trucks.

It also enables a reduction in the logistical cost, especially when returning containers empty, considering that the chests 300 can be transported inside the containers 200.

The use of the set of cargo containers 100 enables the transport of retail goods (lower volume and/or small quantities) without increasing the logistical cost as the said set 100 allows the combination of containers 200 and chests 300 as needed.

Notably, the invention allows the chests 300 to be easily transported to the retail store and programmably opened, in addition to enabling the mitigation or elimination of box disposal in the retail market.

Additionally, the set of cargo containers 100 guarantee the integrity and inviolability of the transported content, since the remote tracking lock 400 eliminates the use of physical seals and allows the programmed opening of the doors as well as the record the opening thereof.

EXAMPLARY USE OF THE INVENTION

As an example, the transportation of goods in a 20 ft shipping container is considered. Such an example is illustrative, but not limiting in relation to the use of the disclosed invention. A 20 ft container can hold up to 2 (two) sets of cargo containers 100, that is, up to 2 (two) containers 200 lined up containing a plurality of chests 300 inside. Each container 200 can hold up to 8 (eight) chests 300 stacked inside, thus allowing to transport up to eight different types of goods. Thus, up to 16 (sixteen) different goods could be transported simultaneously without any risk of contact or contamination therebetween inside a 20 ft dry box.

A 40 ft dry box container, in turn, would hold up to 32 (thirty-two) chests 300 and, consequently, up to 32 different types of goods could be transported by this means.

After filling each chest 300, the remote tracking lock 400 can be activated and programmed to be opened, e.g., only at the destination. The chests 300 are then introduced in the containers 200. After receiving the chests 300 or even other cargo outside the said chests, the lock 400 of the container 200 can be activated and programmed to open, for example, at certain destinations.

When the cargo arrives at the scheduled destination, the lock 400 of the container 200 can be released by remote activation or local unlocking (e.g., password, biometrics, electronic key, or any other device). The chests 300, all or in part, can be removed from the container 200 and transported manually or by forklift to a warehouse, for example, or eventually directly to a retail shelving, as appropriate.

In case of any abnormal condition, the locks 400 are not released, and an alarm can be triggered, alerting the entire logistics chain.

Those skilled in the art can appreciate the functionality and versatility that the set of cargo containers provides both in terms of both logistical potential and reduction of operating costs.

Modifications to embodiments of the present disclosure described in the foregoing are possible without departing from the scope of the present disclosure as defined by the accompanying claims. Expressions such as "including", "comprising", "incorporating", "have", "is" used to describe, and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

The invention claimed is:

1. A set of cargo containers comprising:

at least one holding container and at least one chest;

wherein the at least one holding container can preferably transport up to eight-chests that are essentially identical to the at least one chest inside;

wherein the width of the at least one holding container is compatible with the working width of a shipping container;

wherein the height of the at least one holding container is compatible with the working height of a shipping container;

wherein the total length of two of the at least one holding containers lined up is compatible with the working length of a 20 foot shipping container;

wherein the total length of four of the at least one holding containers lined up is compatible with the working length of a 40 foot shipping container;

wherein the at least one holding container includes retractable castors that can be embedded inside the at least one holding container and recesses provided in the upper wall of the at least one holding container;

wherein the at least one chest includes castors attached to trapezoidal supports;

wherein the at least one holding container includes means for stacking another at least one container on the at least one container; and wherein the at least one holding container includes four recesses in its upper wall with each of the four recesses holding castors for another holding container stacked immediately above.

2. The set of cargo containers of claim 1, further comprising:

a metallic structure made of steel and having parallelepiped format;

a door formed by double sheets with a manual lock;

a base fitted with recesses for forklift forks; lifting points at the vertices for eventual cable anchorage or mooring; and a floor provided inside to hold the cargo.

3. The set of cargo containers of claim 1, further comprising:

means for stably stacking another at least one chest on the at least one chest;

wherein the at least one chest comprises four recesses in its upper wall, wherein each recess having the ability to hold castors for another of the at least one chests stacked immediately above; and wherein the engagement of the chests at least one chest with the another of the at least one chests takes place by clamps inserted in the anchor points of the at least one chest with the another of the at least one chest.

4. The set of cargo containers of claim 3, wherein the at least one chest includes a metallic structure made of steel and having a parallelepiped format, a single sheet door with a locking means, a base with recesses for forklift forks, a steel floor provided inside in order to hold the cargo, and anchor points.

5. The set of cargo containers of claim 1, wherein the at least one holding container has a length of about 290 cm, a width of about 210 cm, and a height of about 210 cm; and wherein the at least one chest has a length of about 140 cm, a width of about 100 cm, and a height of about 95 cm.

6. The set of cargo containers of claim 1, wherein the set of cargo containers can be carried by at least one inside dry box shipping container, directly on dry cargo, bulk carriers, box, sider, or car hauler trucks via maritime, river, air, rail, or road transport modes, and inside of dry cargo, bulk carriers, box, sider, or car hauler trucks via maritime, river, air, rail, or road transport modes.

7. A remote tracking lock for locking at least one of the at least one holding container and the at least one chest set forth in claim 1, wherein the remote activation lock comprises:

an electronic lock or latch incorporating a global system for a mobile chip for allowing at least one of remote tracking and activation;

wherein the remote activation lock can be tracked redundantly by at least one of a global positioning system and a satellite;

means for supplying power by at least one of batteries and solar panels;

a control center that allows programming the opening of the lock and recording the door openings;

means for face-to-face activation of the remote activation lock through at least one of a QR code reader and a numerical keyboard; and an alarm for warning of an abnormal condition.

8. A remote tracking lock for locking at least one of the containers and the chests set forth in claim 4, wherein the remote activation lock comprises:

an electronic lock or latch incorporating a global system for a mobile chip for allowing at least one of remote tracking and activation;

wherein the remote activation lock can be tracked redundantly by at least one of a global positioning system and a satellite;

means for supplying power by at least one of batteries and solar panels;

a control center that allows programming the opening of the lock and recording the door openings;

means for face-to-face activation of the remote activation lock through at least one of a QR code reader and a numerical keyboard; and an alarm for warning of an abnormal condition.

9. A set of cargo containers comprising:

at least one holding container and at least one chest;

wherein the at least one holding container can preferably transport up to eight of the at least one chests inside;

wherein the width of the at least one holding container is compatible with the working width of a shipping container;

wherein the height of the at least one holding container is compatible with the working height of a shipping container;

wherein the total length of two of the at least one holding containers lined up is compatible with the working length of a 20 foot shipping container;

wherein the total length of four of the at least one holding containers lined up is compatible with the working length of a 40 foot shipping container;

wherein a metallic structure is made of steel and has a parallelepiped format;

wherein a door is formed by double sheets with a manual lock;

wherein a base is fitted with recesses for forklift forks;

wherein lifting points are at vertices for eventual cable anchorage or mooring; and wherein a floor provided inside to hold the cargo.

10. The set of cargo containers of claim 9, wherein the at least one holding container has a length of about 290 cm, a width of about 210 cm, and a height of about 210 cm; and wherein the at least one chest has a length of about 140 cm, a width of about 100 cm, and a height of about 95 cm.

11. The set of cargo containers of claim 9, wherein the set of cargo containers can be carried by at least one inside dry box shipping container, directly on dry cargo, bulk carriers, box, sider, or car hauler trucks via maritime, river, air, rail, or road transport modes, and inside of dry cargo, bulk carriers, box, sider, or car hauler trucks via maritime, river, air, rail, or road transport modes.

* * * * *